US012665841B2

(12) United States Patent
Xu et al.

(10) Patent No.: US 12,665,841 B2
(45) Date of Patent: Jun. 23, 2026

(54) PACKET FORWARDING METHOD, APPARATUS, AND SYSTEM, AND COMPUTER-READABLE STORAGE MEDIUM

(71) Applicant: HUAWEI TECHNOLOGIES CO., LTD., Shenzhen (CN)

(72) Inventors: Ling Xu, Beijing (CN); Xia Chen, Beijing (CN); Shuping Peng, Beijing (CN); Peng Hou, Beijing (CN); Yu Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 18/486,253

(22) Filed: Oct. 13, 2023

(65) Prior Publication Data

US 2024/0048477 A1     Feb. 8, 2024

Related U.S. Application Data

(63) Continuation of application No. PCT/CN2022/086359, filed on Apr. 12, 2022.

(30) Foreign Application Priority Data

Apr. 15, 2021   (CN) .......................... 202110406331.5

(51) Int. Cl.
*H04L 45/302*      (2022.01)
*H04L 45/02*       (2022.01)
(Continued)

(52) U.S. Cl.
CPC ............ *H04L 45/306* (2013.01); *H04L 45/04* (2013.01); *H04L 47/76* (2013.01); *H04L 47/803* (2013.01); *H04W 4/50* (2018.02)

(58) Field of Classification Search
CPC ....... H04L 45/306; H04L 45/04; H04L 47/76; H04L 47/803; H04L 47/822;
(Continued)

(56) References Cited

U.S. PATENT DOCUMENTS

| | | | |
|---|---|---|---|
| 8,099,478 B2 * | 1/2012 | Mimura | .................... G06F 8/61 |
| | | | 709/243 |
| 9,654,402 B2 * | 5/2017 | Nooren | ............... H04L 41/5019 |

(Continued)

FOREIGN PATENT DOCUMENTS

WO        2020249128 A1    12/2020

OTHER PUBLICATIONS

European Extended Search Report for Application No. 22787527 dated Aug. 14, 2024, 11 pages.

*Primary Examiner* — Eunsook Choi

(57) ABSTRACT

A packet forwarding method, apparatus, and system, and a computer-readable storage medium are disclosed, and pertain to the field of communication technologies. After receiving a packet sent by a second device, a first device determines a target service node based on indication information and an application service identifier that are in the packet, where a service capability of the target service node matches the indication information, and a target application service corresponding to the application service identifier is deployed in the target service node. Then, the first device sends the packet to the target service node. The indication information is carried in the packet sent by the device, so that a forwarding device can send the packet to a service node whose service capability matches the indication information. In this way, differentiated application services are provided for devices of different levels, and flexibility of task scheduling is high.

18 Claims, 7 Drawing Sheets

| Ethernet header | IP header | TCP header | BGP data packet | FCS |
|---|---|---|---|---|

| BGP header | BGP message |
|---|---|

| Withdrawn routes length | Withdrawn routes | Total path attribute length | Path attributes | NLRI |
|---|---|---|---|---|

(51) Int. Cl.
    *H04L 47/76*      (2022.01)
    *H04L 47/80*      (2022.01)
    *H04W 4/50*      (2018.01)

(58) Field of Classification Search
    CPC . H04L 67/1008; H04L 45/302; H04L 47/805;
             H04L 67/1012; H04L 67/56; H04L
             41/5019; H04L 41/5022; H04L 67/10;
        H04L 69/22; H04W 4/50; H04W 28/084;
                  H04W 40/20; H04W 40/22
    See application file for complete search history.

(56)             References Cited

U.S. PATENT DOCUMENTS

| | | | | |
|---|---|---|---|---|
| 10,469,362 | B1 * | 11/2019 | Burns | H04L 45/247 |
| 10,499,304 | B1 * | 12/2019 | Stauffer | H04W 36/00835 |
| 11,431,585 | B2 * | 8/2022 | Yang | H04L 67/101 |
| 11,991,260 | B2 * | 5/2024 | Badic | H04W 4/50 |
| 2015/0006733 | A1 | 1/2015 | Khan et al. | |
| 2016/0080280 | A1 * | 3/2016 | Ramachandran | H04L 45/302 |
| | | | | 370/235 |
| 2022/0360645 | A1 * | 11/2022 | Badic | H04L 67/51 |

* cited by examiner

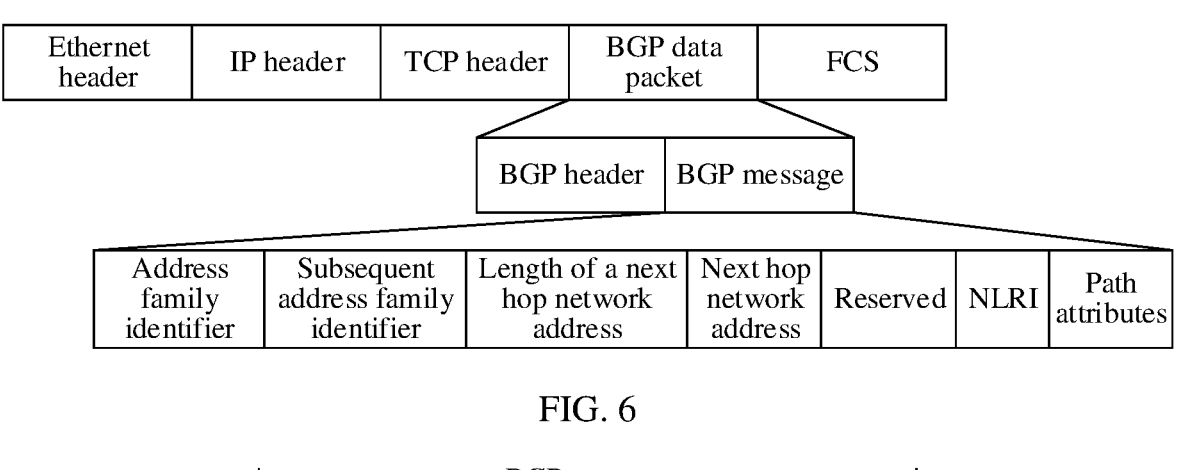

| Ethernet header | IP header | TCP header | BGP data packet | FCS |
|---|---|---|---|---|

| BGP header | BGP message |
|---|---|

| Address family identifier | Subsequent address family identifier | Length of a next hop network address | Next hop network address | Reserved | NLRI | Path attributes |
|---|---|---|---|---|---|---|

FIG. 6

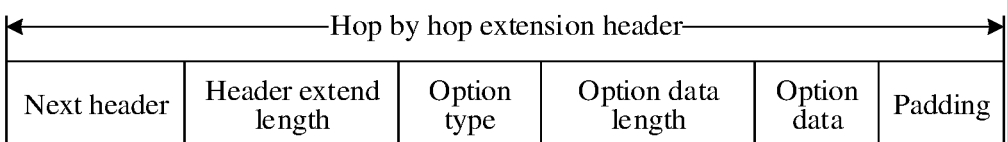

| BGP message | | |
|---|---|---|
| Address family identifier | Subsequent address family identifier | Withdrawn routes |

FIG. 7

| Hop by hop extension header | | | | | |
|---|---|---|---|---|---|
| Next header | Header extend length | Option type | Option data length | Option data | Padding |

FIG. 8

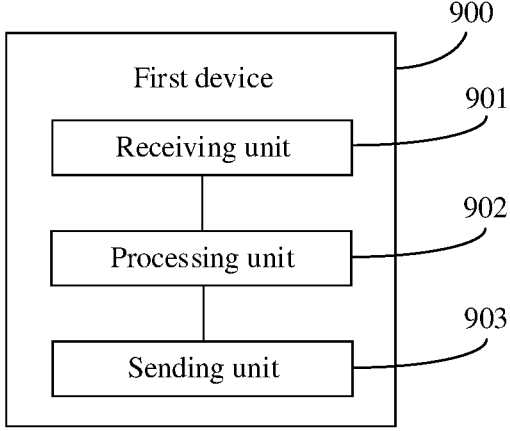

PACKET FORWARDING METHOD, APPARATUS, AND SYSTEM, AND COMPUTER-READABLE STORAGE MEDIUM

CROSS-REFERENCE TO RELATED APPLICATIONS

This application is a continuation of International Application No. PCT/CN2022/086359, filed on Apr. 12, 2022, which claims priority to Chinese Patent Application No. 202110406331.5, filed on Apr. 15, 2021. The disclosures of the aforementioned applications are hereby incorporated by reference in their entireties.

TECHNICAL FIELD

This application relates to the field of communication technologies, and in particular, to a packet forwarding method, apparatus, and system, and a computer-readable storage medium.

BACKGROUND

Construction of a wireless communication network is centered on a data center (DC). Each data center is managed by using a distributed cloud technology to form a hierarchical network system including an edge cloud and a central cloud. An application service provided by the data center for user equipment (UE) is deployed on each edge cloud, so that the application service is deployed closer to a location of the user equipment. This reduces a service latency and meets a requirement of a latency-sensitive service. An infrastructure platform for implementing edge cloud deployment may be referred to as a mobile edge computing (MEC) site.

A same application service is usually deployed at a plurality of MEC sites. Because different MEC sites work independently, for the same application service, a phenomenon that the application service on some MEC sites is overloaded while resources of the application service on other MEC sites are idle may occur.

Currently, a computing first network (CFN) technology may be used to implement load balancing of a same application service on a plurality of MEC sites. A basic idea of the CFN technology is as follows: Computing power information of an application service deployed at an MEC site is sensed through a network, and a task corresponding to the application service is scheduled based on computing power information of a same application service deployed at a plurality of MEC sites. For example, an application service A is deployed at both an MEC site 1 and an MEC site 2. A computing power resource allocated by the MEC site 1 to the application service A is a 2-core central processing unit (CPU), and a computing power resource allocated by the MEC site 2 to the application service A is a 1-core CPU. In this case, tasks corresponding to the application service A may be scheduled to the MEC site 1 and the MEC site 2 based on a load sharing ratio of 2:1.

However, during current task scheduling, only the computing power information of the application service deployed at the MEC site is considered. The MEC site cannot provide differentiated application services for different user equipment, and flexibility of task scheduling is low.

SUMMARY

This application provides a packet forwarding method, apparatus, and system, and a computer-readable storage medium, to resolve a problem that current flexibility of task scheduling is low.

According to a first aspect, a packet forwarding method is provided. The method includes: A first device receives a packet sent by a second device, where the packet includes indication information and an application service identifier. The first device determines a target service node based on the indication information and the application service identifier, where a service capability of the target service node matches the indication information, and a target application service corresponding to the application service identifier deployed in the target service node. The first device sends the packet to the target service node.

Optionally, the second device is user equipment or a network device located between the user equipment and the first device.

In this application, the indication information and the application service identifier are included in the packet sent by the second device, so that after receiving the packet, the first device can send the packet to a service node in which an application service corresponding to the application service identifier is deployed and whose service capability matches the indication information. In this way, differentiated application services are provided for devices of different levels, so that the devices of the different levels can enjoy application services matching the levels, improving flexibility of packet forwarding and flexibility of task scheduling.

In a first implementation, the second device is user equipment, the indication information includes a user service level corresponding to the second device, and the first device stores correspondences between computing power resource levels and user service levels of application services deployed in a plurality of service nodes. An implementation process in which the first device determines a target service node based on the indication information and the application service identifier includes: The first device determining, as the target service node based on the correspondences, a service node in which the target application service whose computing power resource level matches the user service level corresponding to the second device is deployed.

In this implementation, computing power resource levels are obtained through division for a same application service deployed in the plurality of service nodes, and a user service level corresponding to the user equipment is included in a packet sent by the user equipment, so that the first device can send the packet to a service node in which the application service whose computing power resource level matches the user service level is deployed. In this way, differentiated application services are provided for user equipment of different user service levels, and flexibility of packet forwarding is high, improving flexibility of task scheduling.

In a second implementation, the indication information includes a computing power resource level corresponding to the second device, and the first device stores computing power resource levels of application services deployed in a plurality of service nodes. An implementation process in which the first device determines the target service node based on the indication information and the application service identifier includes: The first device determines, as the target service node, a service node in which the target application service whose computing power resource level is the same as the computing power resource level corresponding to the second device is deployed.

In this implementation, computing power resource levels are obtained through division for a same application service deployed in the plurality of service nodes, and a computing power resource level corresponding to the second device is included in a packet sent by the second device, so that the first device can send the packet to a service node in which the application service whose computing power resource level is the same as the computing power resource level corresponding to the second device is deployed. In this way, differentiated application services are provided for devices of different levels, and flexibility of packet forwarding is high, improving flexibility of task scheduling.

Optionally, the first device further receives first messages sent by the plurality of service nodes, where the first message includes a computing power resource level of an application service deployed in a corresponding service node.

Optionally, the first message is a border gateway protocol (BGP) update message, and the computing power resource level is carried in a path attributes field in the BGP update message.

Optionally, the first message further includes an application service identifier of the application service deployed in the service node and an internet protocol IP address of an instance of the application service deployed in the service node. Alternatively, the first message further includes an anycast IP address corresponding to the application service deployed in the service node.

In a third implementation, the indication information includes computing power resource requirement information of the second device. An implementation process in which the first device determines a target service node based on the indication information and the application service identifier includes: the first device determines, as the target service node, a service node in which the target application service whose computing power information meets a requirement indicated by the computing power resource requirement information of the second device is deployed.

In this implementation, the computing power resource requirement information of the second device is included in the packet sent by the second device, so that the first device can send the packet to a service node that meets the computing power resource requirement of the second device. In this way, differentiated application services are provided for devices having different computing power resource requirements, and flexibility of task scheduling is improved.

Optionally, the first device further receives a second message sent by the service node, where the second message includes computing power information of an application service deployed in the service node.

Optionally, the computing power resource requirement information includes one or more of a quantity of required computing power resources, maximum allowable computing power resource utilization, or a maximum allowable latency of requested processing. The computing power information of the application service includes one or more of a quantity of computing power resources allocated to the application service, computing power resource utilization of the application service, a request processing latency of the application service, a quantity of device connections of the application service, or a heavy/light load status of the application service.

Optionally, the packet further includes content requested to be processed. The first device further receives a processing result for the content sent by the target service node. The first device sends the processing result to the second device.

Optionally, the packet is a computation request packet, a go-online request packet, or a storage request packet.

Optionally, the packet is an IPv6 packet, and the indication information is carried in a hop by hop extension header or a segment routing header of the IPv6 packet.

According to a second aspect, another packet forwarding method is provided. The method includes: A service node generates a first message, where the first message includes a computing power resource level of an application service deployed in the service node. The service node sends the first message to a first device.

Optionally, the first message is a BGP update message, and the computing power resource level is carried in a path attributes field in the BGP update message.

Optionally, the first message further includes an application service identifier of the application service deployed in the service node and an internet protocol IP address of an instance of the application service deployed in the service node. Alternatively, the first message further includes an anycast IP address corresponding to the application service deployed in the service node.

Optionally, the service node further receives a packet sent by the first device, where the packet includes content requested to be processed. After processing the content, the service node sends a processing result for the content to the first device.

According to a third aspect, a packet forwarding apparatus is provided, applied to a first device. The apparatus includes:

a receiving unit, configured to receive a packet sent by a second device, where the packet includes indication information and an application service identifier;

a processing unit, configured to determine a target service node based on the indication information and the application service identifier, where a service capability of the target service node matches the indication information, and a target application service corresponding to the application service identifier is deployed in the target service node; and a sending unit, configured to send the packet to the target service node.

Optionally, the second device is user equipment, the indication information includes a user service level corresponding to the second device, and the apparatus stores correspondences between computing power resource levels and user service levels of application services deployed in a plurality of service nodes.

The processing unit is configured to determine, as the target service node based on the correspondences, a service node in which the target application service whose computing power resource level matches the user service level corresponding to the second device is deployed.

Optionally, the indication information includes a computing power resource level corresponding to the second device, and the apparatus stores computing power resource levels of application services deployed in a plurality of service nodes.

The processing unit is configured to determine, as the target service node, a service node in which the target application service whose computing power resource level is the same as the computing power resource level corresponding to the second device is deployed.

Optionally, the receiving unit is further configured to receive a first message sent by the plurality of service nodes, where the first message includes a computing power resource level of an application service deployed in a corresponding service node.

Optionally, the first message is a BGP update message, and the computing power resource level is carried in a path attributes field in the BGP update message.

Optionally, the first message further includes an application service identifier of the application service deployed in the service node and an internet protocol IP address of an instance of the application service deployed in the service node.

Alternatively, the first message further includes an anycast IP address corresponding to the application service deployed in the service node.

Optionally, the indication information includes computing power resource requirement information of the second device.

The processing unit is configured to determine, as the target service node, a service node in which the target application service whose computing power information meets a requirement indicated by the computing power resource requirement information of the second device is deployed.

Optionally, the receiving unit is further configured to receive a second message sent by the service node, where the second message includes computing power information of an application service deployed in the service node.

Optionally, the computing power resource requirement information includes one or more of a quantity of required computing power resources, maximum allowable computing power resource utilization, or a maximum allowable latency of requested processing.

The computing power information of the application service includes one or more of a quantity of computing power resources allocated to the application service, computing power resource utilization of the application service, a request processing latency of the application service, a quantity of device connections of the application service, or a heavy/light load status of the application service.

Optionally, the packet further includes content requested to be processed.

The receiving unit is further configured to receive a processing result for the content sent by the target service node.

The sending unit is further configured to send the processing result to the second device.

Optionally, the packet is a computation request packet, a go-online request packet, or a storage request packet.

Optionally, the packet is an IPv6 packet, and the indication information is carried in a hop by hop extension header or a segment routing header of the IPv6 packet.

According to a fourth aspect, a packet processing apparatus is provided, applied to a service node. The apparatus includes:

a processing unit, configured to generate a first message, where the first message includes a computing power resource level of an application service deployed in the service node; and a sending unit, configured to send the first message to a first device.

Optionally, the first message is a BGP update message, and the computing power resource level is carried in a path attributes field in the BGP update message.

Optionally, the first message further includes an application service identifier of the application service deployed in the service node and an internet protocol IP address of an instance of the application service deployed in the service node.

Alternatively, the first message further includes an anycast IP address corresponding to the application service deployed in the service node.

Optionally, the apparatus further includes a receiving unit.

The receiving unit is configured to receive a packet sent by the first device, where the packet includes content requested to be processed.

The sending unit is further configured to send a processing result for the content to the first device after the processing unit processes the content.

According to a fifth aspect, a device is provided, including a processor and a memory.

The memory is configured to store a computer program, where the computer program includes program instructions.

The processor is configured to call the program instructions to implement the packet forwarding method according to any one of implementations in the first aspect.

According to a sixth aspect, a service node is provided, including a processor and a memory.

The memory is configured to store a computer program, where the computer program includes program instructions.

The processor is configured to call the program instructions to implement the packet forwarding method according to any one of implementations in the second aspect.

According to a seventh aspect, a packet forwarding system is provided. The system includes a first device and at least one service node, the first device includes the apparatus according to any one of implementations in the third aspect, and the service node includes the apparatus according to any one of implementations in the fourth aspect.

According to an eighth aspect, a computer-readable storage medium is provided. The computer-readable storage medium stores instructions. When the instructions are executed by a processor of a device, the packet forwarding method according to any one of implementations in the first aspect is implemented; or when the instructions are executed by a processor of a service node, the packet forwarding method according to any one of implementations in the second aspect is implemented.

According to a ninth aspect, a chip is provided. The chip includes a programmable logic circuit and/or program instructions. When the chip runs, the packet forwarding method according to any one of implementations in the first aspect or the packet forwarding method according to any one of implementations in the second aspect is implemented.

According to a tenth aspect, a computer program product is provided, including a computer program. When the computer program is executed by a processor, the packet forwarding method according to any one of implementations in the first aspect or the packet forwarding method according to any one of implementations in the second aspect is implemented.

BRIEF DESCRIPTION OF DRAWINGS

FIG. 6 is a schematic diagram of a structure of another first message obtained by extending a BGP update message according to an embodiment of this application;

FIG. 7 is a schematic diagram of a structure of a BGP message field used for withdrawing a route according to an embodiment of this application;

FIG. 8 is a schematic diagram of a structure of a hop by hop extension header obtained by extending a next header of an IPv6 header according to an embodiment of this application;

FIG. 9 is a schematic diagram of a structure of a first device according to an embodiment of this application;

DESCRIPTION OF EMBODIMENTS

To make the objectives, technical solutions, and advantages of this application clearer, the following further describes the implementations of this application in detail with reference to the accompanying drawings.

Figure 1:
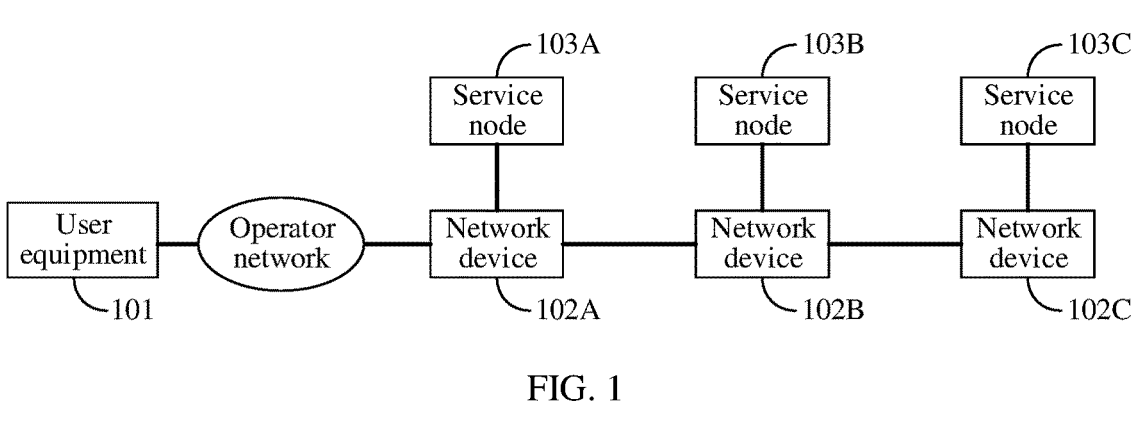
FIG. 1 is a schematic diagram of an application scenario related to a packet forwarding method according to an embodiment of this application.

FIG. 1 is a schematic diagram of an application scenario related to a packet forwarding method according to an embodiment of this application. As shown in FIG. 1, the application scenario includes user equipment 101, network devices 102A to 102C (collectively referred to as a network device 102), and service nodes 103A to 103C (collectively referred to as a service node 103). The user equipment 101 is a device deployed in a user side. The network device 102 and the service node 103 may be devices deployed in an application service provider side. In this case, the user equipment 101 communicates with the network device 102 through an operator network. Alternatively, the network device 102 may be a device deployed in an operator side, in other words, the network device 102 is a device in the operator network. The service node 103 may be a device deployed in an application service provider side. Alternatively, both the network device 102 and the service node 103 may be devices deployed in an operator side. A quantity and a connection manner of each device in FIG. 1 are merely used as an example for descriptions, and are not intended to limit the application scenario related to the method provided in this embodiment of this application.

A client is installed on the user equipment 101. The user equipment 101 can initiate a request based on the client installed on the user equipment 101, to enjoy a corresponding application service. In this embodiment of this application, the application service refers to a service provided for the user equipment by using various types of applications (APP), for example, a computing processing service (especially an intensive computing service), an application go-online service, or a content storage service.

The network device 102 may be a router, a switch, a gateway (GW), or the like. In the application scenario shown in FIG. 1, relative to a deployment position of the user equipment 101, the network device 102 may include the network device 102A close to the user equipment 101 and the network device 102B and the network device 102C that are far away from the user equipment 101.

In this embodiment of this application, the network device 102A close to the user equipment 101 may be used as a scheduling node, and is configured to determine a target service node that processes a packet, and send the packet to the target service node after receiving the packet from the user equipment 101. The network device 102A close to the user equipment 101 may alternatively be referred to as an entry node that enables the user equipment 101 to access an application service provider network. Alternatively, another network device 102 on the application service provider side may be alternatively used as a scheduling node. This is not limited in this embodiment of this application.

Figure 2:
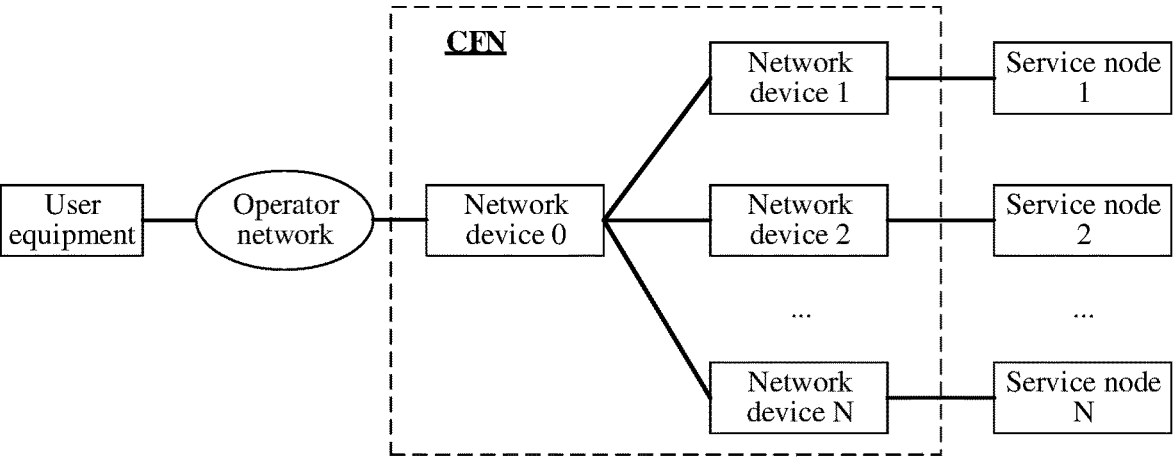
FIG. 2 is a schematic diagram of a deployment architecture of a computing first network according to an embodiment of this application.

Optionally, the network device 102 has a computing power sensing capability, and can sense a computing capability of an application service deployed in the service node 103. In this case, the application service provider network is also a computing first network. There may be a plurality of deployment manners of the computing first network. For example, FIG. 2 is a schematic diagram of a deployment architecture of a computing first network according to an embodiment of this application. As shown in FIG. 2, the computing first network (CFN) includes network devices 0 to N. The network device 0 is connected to user equipment through an operator network. The network device 0 is further connected to network devices 1 to N. The network devices 1 to N are separately connected to one service node, and N is an integer greater than 1. Deployment manners of the computing first network are not limited in this embodiment of this application.

The service node 103 may be deployed in one server, or deployed in a server cluster including a plurality of servers. The service node 103 is configured to provide a service platform for an application. At least one instance is deployed in each service node 103, and the instance is configured to provide an application service for the user equipment 101. The instance is a specific application service that is deployed in different service nodes. Therefore, one application service can correspond to a plurality of instances. In this embodiment of this application, the application service may be deployed in a plurality of service nodes 103 in a distributed manner. For example, in the application scenario shown in FIG. 1, a first instance is deployed in the service node 103A, a second instance is deployed in the service node 103B, and a third instance is deployed in the service node 103C. The first instance, the second instance, and the third instance are instances of a same application service. In this embodiment of this application, that an application service is deployed in a service node means that an instance of the application service is deployed in the service node.

Different service nodes 103 may be configured with computing resources and storage resources (which may be collectively referred to as computing power resources) of different scales. The computing resource includes a CPU resource and/or a graphics processing unit (GPU) resource, and the like. The storage resource includes a memory resource and/or a disk resource, and the like. In the different service nodes 103, computing power resources allocated to a same application service may be different. For example, a 2-core CPU is allocated to the first instance of the service node 103A, a 4-core CPU is allocated to the second instance of the service node 103B, and a 1-core CPU is allocated to the third instance of the service node 103C.

The service node 103 may store an application service identifier of an application service deployed in the service node 103. The application service identifier is used for uniquely identifying a corresponding application service, to distinguish different application services. In this embodiment of this application, an application service identifier that can uniquely identify an application service may be collectively allocated to each application service. The application service identifier may be in a form of an internet protocol (IP) address, or may be in another form. This is not limited in this embodiment of this application.

An instance of each application service further has an instance identifier. The instance identifier is used for uniquely identifying a corresponding instance, to distinguish different instances of a same application service. In other words, different instances of a same application service have a same application service identifier but different instance identifiers. The instance identifier may be in a form of an IP address of the instance, or may be in another form. This is not limited in this embodiment of this application. It should be noted that when both the application service identifier and the instance identifier are in a form of an IP address, the transmit end and/or the receive end may distinguish the application service identifier and the instance identifier through different fields in a packet. For example, a transmit end and a receive end agree with each other that a first field of a packet is an application service identifier, and a second field is an instance identifier. When sending the packet to the receive end, the transmit end may set an IP address of an application service in the first field of the packet, and set an IP address of an instance in the second field of the packet. After receiving the packet, the receive end can parse out the IP address of the application service and the IP address of the instance from a corresponding field.

Figure 3:
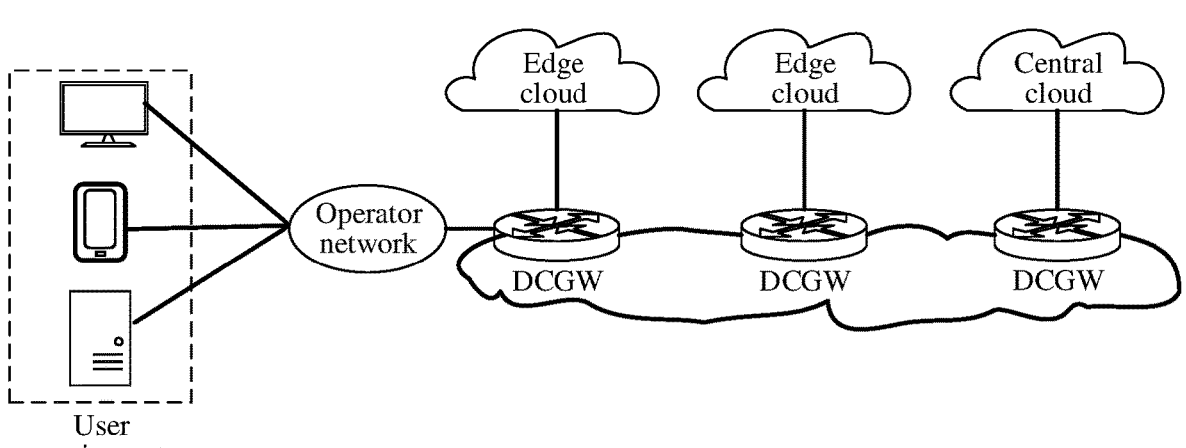
FIG. 3 is a schematic diagram of a structure of a hierarchical network system of an edge cloud plus a central cloud according to an embodiment of this application.

Optionally, in an edge cloud deployment scenario, the network device 102 may be a data center gateway, and the service node 103 may be deployed in the edge cloud. For example, the service node 103 may be an MEC site. For example, FIG. 3 is a schematic diagram of a structure of a hierarchical network system of an edge cloud plus a central cloud according to an embodiment of this application. A cloud deployment scenario shown in FIG. 3 corresponds to the application scenario shown in FIG. 1. The network device 102 in FIG. 1 is mapped to the data center gateway (DCGW) in FIG. 3, and the service node 103 in FIG. 1 is mapped to the edge cloud or the central cloud in FIG. 3.

Different users may have different user service levels for a same application service. For example, based on different payment of a user, the user service levels may be classified into a gold subscriber, a silver subscriber, a bronze subscriber, and a common user in descending order. A higher user service level indicates that a user should enjoy a better application service. However, during current task scheduling, only computing power information of an application service deployed in a service node is considered, tasks of the different user service levels are considered as the same, and differentiated application services cannot be provided for different users based on the different user service levels.

Figure 4:
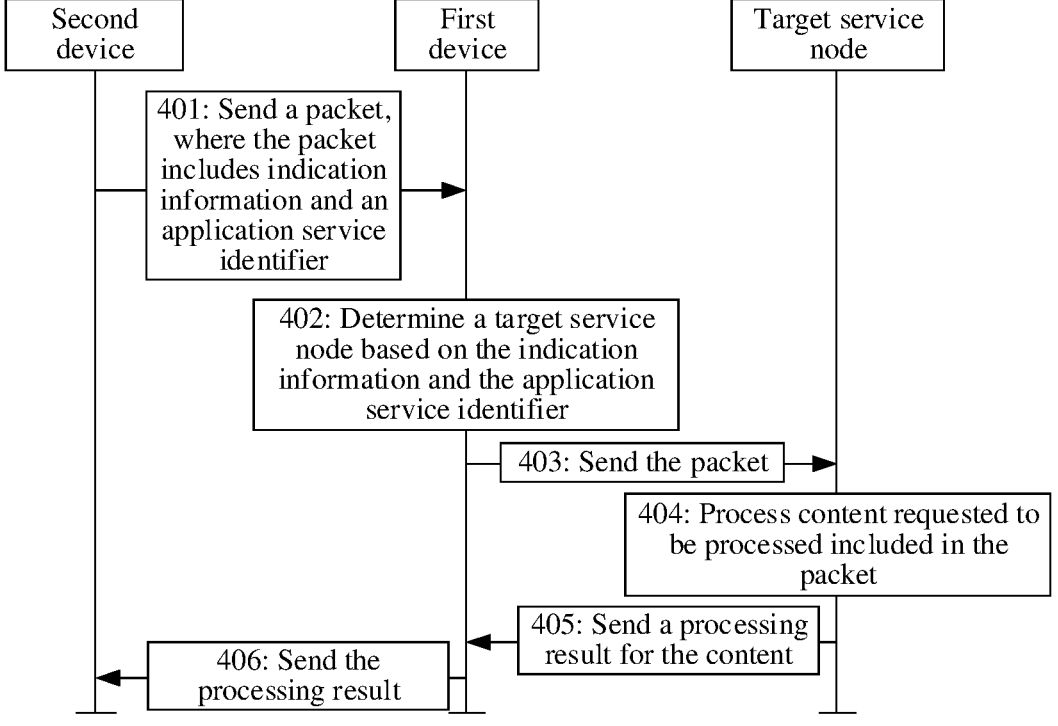
FIG. 4 is a schematic flowchart of a packet forwarding method according to an embodiment of this application.

In a packet forwarding method provided in embodiments of this application, indication information and an application service identifier are included in a packet that is from user equipment, so that after receiving the packet, a network device can send the packet to a service node in which an application service corresponding to the application service identifier is deployed and whose service capability matches the indication information. In this way, differentiated application services are provided for user equipment of different levels, so that the user equipment of the different levels can enjoy an application service matching the level. FIG. 4 is a schematic flowchart of a packet forwarding method according to an embodiment of this application. The method may be applied to an application scenario shown in any one of FIG. 1 to FIG. 3. As shown in FIG. 4, the method includes the following steps.

Step 401: A second device sends a packet to a first device, where the packet includes indication information and an application service identifier.

The first device is a network device configured to forward a packet. For example, the network device may be the network device 102A shown in FIG. 1, the network device 0 shown in FIG. 2, or the DCGW shown in FIG. 3. Optionally, the second device is user equipment. For example, the user equipment may be the user equipment 101 shown in FIG. 1. Alternatively, the second device may be a device located between the user equipment and the first device. That a second device sends a packet to a first device may be that the second device directly sends the packet to the first device, or may be that the second device indirectly sends the packet to the first device via another device.

The indication information in the packet indicates a service capability that a service node that processes the packet needs to have. In this embodiment of this application, the service capability of the service node is measured by a granularity of an application service. A service capability of a service node for an application service may be determined based on computing power information of the application service deployed in the service node. The computing power information of the application service deployed in the service node includes one or more of a quantity of computing power resources allocated to the application service, computing power resource utilization of the application service, a request processing latency of the application service, a quantity of device connections of the application service, or a heavy/light load status of the application service. The quantity of computing power resources allocated to the application service may include a quantity of cores of a CPU and/or a quantity of cores of a GPU that are in the service node and that are allocated to the application service. For example, a 2-core CPU and a 4-core GPU are allocated to a particular application service in the service node. The computing power resource utilization of the application service may include utilization of the CPU, utilization of the GPU, and/or the like allocated to the application service in the service node. The request processing latency of the application service may include an average processing latency, a maximum processing latency, and/or a minimum processing latency for a packet of an instance of the application service in the service node in a period of time. The quantity of device connections of the application service refers to a quantity of terminals that access the application service in the service node, and the terminal that accesses the application service in the service node is served by the instance of the application service in the service node. The heavy/light load status of the application service indicates whether the instance of the application service in the service node is in a heavy-load state or a light-load state. The heavy-load state reflects that load of the instance is heavy, and the light-load state reflects that load of the instance is light.

Optionally, the indication information includes a user service level corresponding to the second device, a computing power resource level corresponding to the second device, or computing power resource requirement information of the second device.

The application service identifier in the packet indicates an application service that the packet requests to access.

Optionally, the packet further includes content requested to be processed. For example, the packet is a computing request packet. The computing request packet includes content to be computed, and the computing request packet is for requesting to perform computing processing on the content included in the computing request packet. For another example, the packet is a go-online request packet. The go-online request packet includes authentication information, and the go-online request packet is for requesting an application to go online. For another example, the packet is a storage request packet. The storage request packet includes content to be stored, and the storage request packet is for requesting to store the content included in the storage request packet in the service node. The packet may alternatively be another service packet. A type of the packet is not limited in this embodiment of this application.

Step 402: The first device determines a target service node based on the indication information and the application service identifier.

A service capability of the target service node matches the indication information, and a target application service corresponding to the application service identifier is deployed in the target service node. In other words, the target service node is a service node in which the target application service that corresponds to the application service identifier is deployed and whose service capability matches the indication information.

Step 403: The first device sends the packet to the target service node.

That the first device sends the packet to the target service node may be that the first device directly sends the packet to the target service node. For example, in the application scenario shown in FIG. 1, the first device is the network device 102A, and the target service node is the service node 103A. In this case, the network device 102A directly sends the packet to the service node 103A. Alternatively, that the first device sends the packet to the target service node may be alternatively that the first device indirectly sends the packet to the target service node via another device. For example, in the application scenario shown in FIG. 1, the first device is the network device 102A, and the target service node is the service node 103B. In this case, the network device 102A indirectly sends the packet to the service node 103A via the network device 102B.

Optionally, the packet includes content requested to be processed. After receiving the packet, the target service node may further perform the following step 404 and step 405.

Step 404: The target service node processes the content requested to be processed included in the packet.

For example, the packet is a computing request packet. That the target service node processes the content in the packet may be computing the content that is to be computed and that is in the computing request packet. For another example, the packet is a go-online request packet. That the target service node processes the content in the packet may be performing application go-online authentication based on an authentication information in the go-online request packet. For another example, the packet is a storage request packet. That the target service node processes the content in the packet may be storing the content that is to be stored and that is in the storage request packet.

Step 405: The target service node sends a processing result for the content to the first device.

For example, the packet sent by the first device to the target service node is the computation request packet. The processing result may be a computing result. For another example, the packet sent by the first device to the target service node is the go-online request packet. The processing result may be an indication that indicates whether an application is allowed to go online. For another example, the packet sent by the first device to the target service node is the storage request packet. The processing result may be a storage success indication or a storage failure indication.

Step 406: The first device sends the processing result to the second device.

In this embodiment of this application, the indication information and the application service identifier are included in the packet sent by the second device, so that after receiving the packet, the first device can send the packet to a service node in which an application service corresponding to the application service identifier is deployed and whose service capability matches the indication information. In this way, differentiated application services are provided for devices of different levels, so that the devices of the different levels can enjoy application services matching the levels, improving flexibility of packet forwarding and flexibility of task scheduling.

Optionally, for different indication information included in the packet, implementation processes of the foregoing packet forwarding method are further described in the following three optional embodiments of this application.

In a first optional embodiment of this application, the second device is user equipment, the indication information in the packet includes the user service level corresponding to the second device, and the first device stores correspondences between computing power resource levels and user service levels of application services deployed in a plurality of service nodes. An implementation process of the foregoing step 402 includes: The first device determines, as the target service node based on the correspondences, a service node in which the target application service whose computing power resource level matches the user service level corresponding to the second device is deployed.

For an application service, a quantity of user service levels obtained through division for different users may be the same as a quantity of computing power resource levels obtained through division for different service nodes. A plurality of user service levels are in a one-to-one correspondence with a plurality of computing power resource levels. For example, for an application service A, user service levels include gold, silver, bronze, and common, and computing power resource levels include L1, L2, L3, and L4. L1 corresponds to gold, L2 corresponds to silver, L3 corresponds to bronze, and L4 corresponds to common. In other words, a gold subscriber corresponds to an application service of an L1 level, a silver subscriber corresponds to an application service of an L2 level, a bronze subscriber corresponds to an application service of an L3 level, and a common user corresponds to an application service of an L4 level.

Alternatively, for an application service, a quantity of user service levels obtained through division for different users may be different from a quantity of computing power resource levels obtained through division for different service nodes. One user service level may correspond to one computing power resource level, a plurality of user service levels may correspond to one computing power resource level, or one user service level may correspond to a plurality of computing power resource levels. For example, for an application service B, user service levels include gold, silver, bronze, and common, and computing power resource levels include L1, L2, and L3. L1 corresponds to gold, L2 corresponds to silver, and L3 corresponds to bronze and common. In other words, a gold subscriber corresponds to an application service of an L1 level, a silver subscriber corresponds to an application service of an L2 level, and a bronze subscriber and a common user correspond to an application service of an L3 level.

For example, Table 1 shows the correspondences, stored by the first device, between computing power resource levels and user service levels of application services deployed in the plurality of service nodes.

TABLE 1

| Service node | Application service identifier | Computing power resource level | User service level |
|---|---|---|---|
| Service node 1 | Application service A | L1 | Gold |
| | Application service B | L2 | Silver |
| Service node 2 | Application service A | L2 | Silver |
| | Application service B | L3 | Bronze and common |
| . . . | . . . | . . . | . . . |

Refer to Table 1. It is assumed that a packet sent by the second device includes a user service level "silver" and an application service identifier "application service A". In this case, the first device may determine the service node 2 as the target service node.

In this embodiment, computing power resource levels are obtained through division for a same application service deployed in the plurality of service nodes, and a user service level corresponding to the user equipment is included in a packet sent by the user equipment, so that the first device can send the packet to a service node in which the application service whose computing power resource level matches the user service level is deployed. In this way, differentiated application services are provided for user equipment of different user service levels, and flexibility of packet forwarding is high. This improves flexibility of task scheduling.

In a second optional embodiment of this application, the indication information in the packet includes the computing power resource level corresponding to the second device, and the first device stores computing power resource levels of application services deployed in a plurality of service nodes. An implementation process of the foregoing step 402 includes: The first device determines, as the target service node, a service node in which the target application service whose computing power resource level is the same as the computing power resource level corresponding to the second device is deployed.

For example, Table 2 shows the computing power resource levels, stored by the first device, of application services deployed in the plurality of service nodes.

TABLE 2

| Service node | Application service identifier | Computing power resource level |
|---|---|---|
| Service node 1 | Application service A | L1 |
| | Application service B | L2 |
| Service node 2 | Application service A | L2 |
| | Application service B | L3 |
| . . . | . . . | . . . |

Refer to Table 2. It is assumed that a packet sent by the second device includes a computing power resource level "L2" and an application service identifier "application service A". In this case, the first device may determine the service node 2 as the target service node.

In this embodiment, computing power resource levels are obtained through division for a same application service deployed in the plurality of service nodes, and a computing power resource level corresponding to the second device is included in a packet sent by the second device, so that the first device can send the packet to a service node in which the application service whose computing power resource level is the same as the computing power resource level corresponding to the second device is deployed. In this way, differentiated application services are provided for devices of different levels, and flexibility of packet forwarding is high. This improves flexibility of task scheduling.

With reference to the first optional embodiment and the second optional embodiment, before the first device determines the target service node based on the indication information and the application service identifier that are in the packet, the first device further receives first messages sent by the plurality of service nodes, where the first message includes a computing power resource level of an application service deployed in a corresponding service node. Then, the first device determines a target service node based on the indication information and the application service identifier that are in the packet in the plurality of service nodes.

In this embodiment of this application, the computing power resource level of the application service deployed in the service node is determined by an operation and maintenance personnel. The operation and maintenance personnel may uniformly manage a plurality of service nodes by using a controller or a network management device, and allocate a computing power resource level to an application service deployed in each service node. Generally, a closer proximity to the service node of the first device (a scheduling node) indicates a higher computing power resource level allocated by the operation and maintenance personnel to the application service deployed in the service node. When allocating the computing power resource to the application service deployed in the service node, the operation and maintenance personnel may also consider a deployment location of the service node. For example, more computing power resources may be allocated to an application service in a service node closer to the first device, so that a higher computing power resource level of the application service deployed in the service node indicates that the service node is closer to a user and more computing power resources are allocated to an instance of the application service deployed in the service node. For example, a high-concurrency scenario may be further considered, so that a ratio of a computing power resource allocated to an instance of an application service with a higher computing power resource level to a peak quantity of user equipment accessing the instance is larger, in other words, a higher computing power resource level of an instance accessed by user equipment indicates that more minimum average computing power resources can be allocated to the user equipment, to ensure that the user equipment with a high user service level can enjoy more computing power resources in the high-concurrency scenario. In this embodiment of this application, a redundant computing power resource may be allocated to an instance that has a highest computing power resource level on a service node and that is in a same application service, to fully ensure service quality of a high-level user, so that a committed service level agreement (SLA) condition is satisfied, for example, it is ensured that a latency of the high-level user is less than a maximum allowable latency.

After obtaining the computing power resource level of the application service deployed in the service node, the service node generates a first message including the computing power resource level of the application service deployed in the service node, and sends the first message to the first device.

For example, Table 3 shows computing power resource levels of a plurality of application services deployed in one service node.

TABLE 3

| Application service identifier | Computing power resource level |
|---|---|
| Application service A | L1 |
| Application service B | L2 |
| . . . | . . . |

Figure 5:
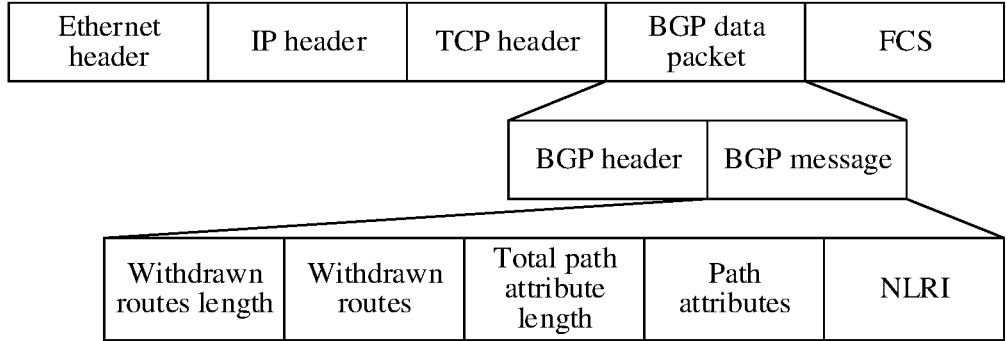
FIG. 5 is a schematic diagram of a structure of a first message obtained by extending a BGP update message according to an embodiment of this application.

Optionally, the first message is a BGP update message. The computing power resource level of the application service deployed in the service node is included in a path attributes field in the BGP update message. For example, FIG. 5 and FIG. 6 are separately schematic diagrams of a structure of a first message obtained by extending a BGP update message according to an embodiment of this application. As shown in FIG. 5 and FIG. 6, the BGP update message includes an Ethernet header, an IP header, a transmission control protocol (TCP) header, a BGP data packet, and a frame check sequence (FCS). The BGP data packet includes a BGP header and a BGP message field. The BGP header includes a maker field, a length field, and a type field (not shown in the figure).

FIG. 5 shows a format of a BGP message field for advertising a route as defined in a request for comment (RFC) (short for RFC 4271) document numbered 4271. As shown in FIG. 5, the BGP message field includes a withdrawn routes length field, a withdrawn routes field, a total path attribute length field, a path attributes field, and a network layer reachability information (NLRI) field. FIG. 6 shows a format of a BGP message field for advertising a route as defined in an RFC 4760 document. As shown in FIG. 6, the BGP message field includes an address family identifier field, a subsequent address family identifier field, a length of next hop network address field, a next hop network address field, a reserved field, an NLRI field, and a path attributes field. If a communication scenario in this embodiment of this application is not a virtual private network (VPN) scenario, and both an interaction route and next-hop information between different devices are internet protocol version 4 (IPv4) types, the format of the BGP message shown in FIG. 5 may be used. Otherwise, the format of the BGP message shown in FIG. 6 may be used.

Optionally, the computing power resource level of the application service deployed in the service node may be included in the routing attribute field after being encoded by using a type-length-value (TLV) or a type-value (TV). For example, a flag bit (flag) field whose length is 1 byte, a type field whose length is 1 byte, a length field whose length is 1 byte, and a payload (value) field whose length is 1 byte may be extended in the path attributes field. The flag bit field is used for identifying a path attribute. The payload field is used for including a computing power resource level. The type field indicates that content included in the payload field is a computing power resource level.

In a first implementation, the first message further includes an application service identifier of the application service deployed in the service node and an IP address of an instance of the application service deployed in the service node. In other words, the first message may include an application service identifier of an application service deployed in a service node, an IP address of an instance of the application service deployed in the service node, and a computing power resource level of the application service deployed in the service node. Because IP addresses of instances deployed in different service nodes for a same application service are different, with reference to an application service identifier, which application service is specifically provided by the instances corresponding to the IP addresses can be distinguished, to implement a directional addressing function.

Optionally, the application service identifier of the application service deployed in the service node is included in a path attributes field in the BGP update message, and the IP address of the instance of the application service deployed in the service node is included in an NLRI field in the BGP update message. The application service identifier of the application service deployed in the service node may be included in the routing attribute field after being encoded by using TLV or TV. For example, a flag bit field whose length is 1 byte, a type field whose length is 1 byte, a length field whose length is 1 byte, and a payload field whose length is 4 bytes may be extended in the path attributes field. The flag bit field is used for identifying a path attribute. The payload field is used for including an application service identifier. The type field indicates that content included in the payload field is an application service identifier.

In a second implementation, the first message further includes an anycast IP address corresponding to the application service deployed in the service node. In other words, the first message may include an anycast IP address corresponding to the application service deployed in the service node and a computing power resource level of the application service deployed in the service node. Different application services correspond to different anycast IP addresses, and instances that are of a same application service and that are deployed in different service nodes correspond to a same anycast IP address.

Optionally, the anycast IP address corresponding to the application service deployed in the service node is included in an NLRI field in the BGP update message.

Optionally, when a specific application service deployed in the service node goes offline, the service node may further send a route withdrawal instruction to the first device, where the route withdrawal instruction includes an anycast IP address corresponding to the application service to be withdrawn, and the route withdrawal instruction instructs the service node to no longer provide the application service. The message type of the route withdrawal indication may be a BGP update message. The route withdrawal instruction may use a BGP update message defined in an RFC 4760 document, and the anycast IP address of the application service to be withdrawn may be included in a withdrawn routes field of the BGP message. FIG. 7 is a schematic diagram of a structure of a BGP message field used for withdrawing a route according to an embodiment of this application. The BGP message field includes an address family identifier field, a subsequent address family identifier field, and a withdraw route field. For a function of each field, refer to a related definition in the RFC 4760 document. Details are not described here in this embodiment of this application. Alternatively, the route withdrawal instruction may alternatively use a BGP update message defined in the RFC 4271 document (as shown in FIG. 5), and the anycast IP address of the application service to be withdrawn may be included in a withdrawn routes field of the BGP message.

Optionally, after receiving the first message sent by the service node, the first device may further generate a routing entry.

With reference to the foregoing first implementation, the first message includes an application service identifier of an application service deployed in a service node, an IP address of an instance of the application service deployed in the service node, and a computing power resource level of the application service deployed in the service node. The routing entry generated by the first device may be shown in Table 4.

TABLE 4

| Computing power resource level | Application service identifier | IP address of an instance | Computing power metric (metric) |
|---|---|---|---|
| L1 | Application service A | IP1.1 (service node 1) | m11 |
| L2 | Application service A | IP1.2 (service node 2) | m12 |
| L2 | Application service A | IP1.3 (service node 3) | m13 |
| L2 | Application service B | IP2.1 (service node 1) | m21 |
| L3 | Application service B | IP2.2 (service node 2) | m22 |
| . . . | . . . | . . . | . . . |

The computing power metric is a measure of computing power of an instance. For example, a computing power metric of an instance may be a converged value obtained by computing power indicators such as a CPU usage, a GPU usage, and/or a quantity of device connections that are of the instance. The computing power metric of the instance is positively correlated with the CPU usage of the instance, is positively correlated with the GPU usage of the instance, and is positively correlated with the quantity of device connections of the instance. Correspondingly, a smaller computing power metric of the instance indicates lower load of the instance. When the first device selects a target service node that sends a packet, if a plurality of service nodes satisfy forwarding condition, the first device may perform load balancing on the plurality of service nodes based on the computing power metric of the instance. For example, refer to Table 4.it is assuming that a packet sent by the second device includes a computing power resource level "L2" and an application service identifier "application service A", and both the service node 2 and the service node 3 satisfy forwarding condition, the first device may compare a computing power metric m12 of an instance of the application service A in the service node 2 with a computing power metric m13 of an instance of the application service A in the service node 3. If m12<m13, the first device determines the service node 2 as a target service node.

Optionally, after obtaining the computing power information of the application service deployed in the service node, the first device may compute a computing power metric of the instance of the application service in the service node. Certainly, the foregoing routing entry may not include the computing power metric. This is not limited in this embodiment of this application.

In this implementation, when the indication information in the packet includes a user service level corresponding to the second device, after receiving the packet sent by the second device, the first device determines a computing power resource level corresponding to the user service level based on Table 1, and then sends the packet to the target service node based on the routing entry shown in Table 4. The first device may separately store Table 1 and Table 4, or may store Table 1 and Table 4 together. When the indication information in the packet includes a computing power resource level corresponding to the second device, after receiving the packet sent by the second device, the first device sends the packet to the target service node based on the routing entry shown in Table 4.

With reference to the foregoing second implementation, the first message includes an anycast IP address corresponding to an application service deployed in a service node and a computing power resource level of the application service deployed in the service node. The routing entry generated by the first device may be shown in Table 5.

TABLE 5

| Computing power resource level | Anycast IP address | Next hop | Computing power metric |
|---|---|---|---|
| L1 | IP1 (application service A) | IP3.1 | m11 |
| L2 | IP1 (application service A) | IP3.1 | m12 |
| L2 | IP1 (application service A) | IP3.2 | m13 |
| L2 | IP2 (application service B) | IP4.1 | m21 |
| L3 | IP2 (application service B) | IP5.1 | m22 |
| . . . | . . . | . . | . . . |

The next hop refers to a next device to which a packet whose destination IP address is a corresponding anycast IP address needs to be forwarded. A next hop of the first device may be connected to a plurality of service nodes in which an application service corresponding to an application service identifier in a packet is deployed. After receiving the packet, the next hop may continue to determine a next hop based on the indication information and the application service identifier that are in the packet until the packet reaches the service node. The device between the first device and the service node may also store a routing entry such as the routing entry shown in Table 5. Details are not described here in this embodiment of this application.

In this implementation, when the indication information in the packet includes a user service level corresponding to the second device, after receiving the packet sent by the second device, the first device determines a computing power resource level corresponding to the user service level based on Table 1, and then sends the packet to the next hop based on the routing entry shown in Table 5. The first device may separately store Table 1 and Table 5, or may store Table 1 and Table 5 together. When the indication information in the packet includes a computing power resource level corresponding to the second device, after receiving the packet sent by the second device, the first device sends the packet to the next hop based on the routing entry shown in Table 5. A destination IP address in the packet sent by the second device is an anycast IP address corresponding to a target application service. The anycast IP address of the target application service may be further used as an application service identifier of the target application service.

In a third optional embodiment of this application, the indication information in the packet includes computing power resource requirement information of the second device. An implementation process of step 402 includes: The first device determines, as the target service node, a service node in which the target application service whose computing power information meets a requirement indicated by the computing power resource requirement information of the second device is deployed.

Optionally, the computing power resource requirement information includes one or more of a quantity of required computing power resources, maximum allowable computing power resource utilization, or a maximum allowable latency of requested processing For example, if computing power resource requirement information of the second device includes an 8-core CPU and CPU utilization does not exceed 50%, the second device determines, as the target service node, a service node whose quantity of cores of a CPU allocated to a deployed target application service is not less than 8 and whose utilization does not exceed 50%.

Optionally, the first device stores computing power information of application services deployed in a plurality of service nodes. After receiving the packet sent by the second device, the first device may first determine a candidate service node in which the target application service corresponding to the application service identifier is deployed in the plurality of service nodes based on the application service identifier in the packet, and then determine, as the target service node, a service node whose computing power information of the target application service deployed in the candidate service node meets a requirement indicated by the computing power resource requirement information in the packet.

In this embodiment, it may be configured that computing power resource requirement information is only included in a packet sent by a high-level device, and no computing power resource requirement information is included in a packet sent by a low-level device, so that the first device can send the packet from the high-level device to a service node that meets the computing power resource requirement of the high-level device, and send the packet from the low-level device to the service node in a load balancing manner, in other words, the packet from the high-level device is processed by using more robust computing resources, and the packet from the low-level device is processed in a best-effort manner.

In this embodiment, the computing power resource requirement information of the second device is included in the packet sent by the second device, so that the first device can send the packet to a service node that meets the computing power resource requirement of the second device. In this way, differentiated application services are provided for devices having different computing power resource requirements, and flexibility of task scheduling is improved. In addition, it may be further configured that computing power resource requirement information is only included in a packet sent by a high-level device, and no computing power resource requirement information is included in a packet sent by a low-level device, so that the first device can send the packet from the high-level device to a service node that meets the computing power resource requirement of the high-level device, and send the packet from the low-level device to the service node in a load balancing manner, in other words, the packet from the high-level device is processed by using more robust computing resources, and the packet from the low-level device is processed in a best-effort manner.

With reference to the third optional embodiment, before the first device determines the target service node based on the indication information and the application service identifier that are in the packet, the first device further receives second messages sent by the plurality of service nodes, where each second message includes computing power information of an application service deployed in a corresponding service node. Then, the first device determines a target service node based on the indication information and the application service identifier that are in the packet in the plurality of service nodes.

Optionally, the service node periodically sends, to the first device, computing power information of each application service deployed in the service node. Alternatively, each time computing power information of an application service deployed in the service node changes, the service node sends changed computing power information of the application service to the first device.

Optionally, the second message further includes an application service identifier of the application service deployed in the service node and an IP address of an instance of the application service deployed in the service node. Alternatively, the second message further includes an anycast IP address corresponding to the application service deployed in the service node. For a type of the second message and a manner of including information, refer to foregoing related descriptions of the first message. Details are not described here again in this embodiment of this application.

Optionally, after receiving the second message sent by the service node, the first device may further generate a routing entry.

When the second message includes an application service identifier of an application service deployed in a service node, an IP address of an instance of the application service deployed in the service node, and computing power information of the application service deployed in the service node, the routing entry generated by the first device may be shown in Table 6.

TABLE 6

| Service node | Application service identifier | IP address of an instance | Computing power metric (metric) |
|---|---|---|---|
| Service node 1 | Application service A | IP1.1 | m11 |
| Service node 2 | Application service A | IP1.2 | m12 |
| Service node 3 | Application service A | IP1.3 | m13 |
| Service node 1 | Application service B | IP2.1 | m21 |
| Service node 2 | Application service B | IP2.2 | m22 |
| . . . | . . . | . . . | . . . |

After receiving the packet sent by the second device, the first device determines which service node provides which application service based on the computing power resource requirement information and the application service identifier that are in the packet, and then sends the packet to a corresponding IP address based on the routing entry shown in Table 6.

Alternatively, when the second message includes an anycast IP address corresponding to the application service deployed in the service node and computing power information of the application service deployed in the service node, a routing entry generated by the first device may be shown in Table 7.

TABLE 7

| Service node | Anycast IP address | Next hop | Computing power metric |
|---|---|---|---|
| Service node 1 | IP1 (application service A) | IP3.1 | m11 |
| Service node 2 | IP1 (application service A) | IP3.1 | m12 |
| Service node 3 | IP1 (application service A) | IP3.2 | m13 |
| Service node 1 | IP2 (application service B) | IP4.1 | m21 |
| Service node 2 | IP2 (application service B) | IP5.1 | m22 |
| . . . | . . . | . . . | . . . |

After receiving the packet sent by the second device, the first device determines which service node provides which application service based on the computing power resource requirement information and the application service identifier that are in the packet, and then sends the packet to a next hop based on the routing entry shown in Table 7. A destination IP address in the packet sent by the second device is an anycast IP address corresponding to a target application service. The anycast IP address of the target application service may be further used as an application service identifier of the target application service.

Optionally, the packet sent by the second device is an IPv6 packet, and the indication information may be included in a hop by hop extension header or a segment routing header (SRH) of the IPv6 packet. The indication information may be included in a hop by hop extension header or an SRH after being encoded by using TLV or TV. For example, a next header field of an IPv6 header may be extended to include a hop by hop extension header. FIG. 8 is a schematic diagram of a structure of a hop by hop extension header obtained by extending a next header of an IPv6 header according to an embodiment of this application. As shown in FIG. 8, the hop by hop extension header includes a next header, a header extend length field, an optional type (option type) field, an optional data length field, an optional data (option data) field, and a padding field. A length of the next header is 1 byte, a length of the header extend length field is 1 byte, a length of the optional type field is 1 byte, a length of the optional data length field is 1 byte, a length of the optional data field is 1 byte, and a length of the padding field is variable. An indication information may be included in the optional data field.

A sequence of steps of the foregoing packet forwarding method provided in this embodiment of this application may be properly adjusted, or steps may be correspondingly added or deleted depending on a situation. Any variation method readily figured out by a person skilled in the art within the technical scope disclosed in this application shall fall within the protection scope of this application. For example, a user service level is included in a packet sent by a second device, so that after receiving the packet, a first device schedules the packet to a service node in a load balancing manner. The service node sequentially processes packets in the service node based on the user service level included in the packet and in descending order of the user service levels. In other words, the service node has a high priority of processing a packet from user equipment with a high user service level, and has a low priority of processing a packet from user equipment with a low user service level, differentiated processing is performed on packets from user equipment of different user service levels, to provide differentiated application services for user equipment of different user service levels. Details are not described here again in this embodiment of this application.

FIG. 9 is a schematic diagram of a structure of a first device according to an embodiment of this application. The first device may implement the function of the first device in the embodiment shown in FIG. 4. As shown in FIG. 9, a first device 900 includes a receiving unit 901, a processing unit 902, and a sending unit 903. These units may perform a corresponding function of the first device in the foregoing method embodiments. The receiving unit 901 is configured to support the first device in performing step 401 (receiving a packet sent by a second device) and step 405 (receiving a processing result that is sent by a target service node and that is for content requested to be processed in the packet) in FIG. 4. The processing unit 902 is configured to support the first device in performing step 402 in FIG. 4 and another process performed by the first device in the technology described in this specification. The sending unit 903 is configured to support the first device in performing step 403 and step 406 in FIG. 4. For example, a receiving unit 901 is configured to perform various information receiving performed by the first device in the foregoing method embodiments; the processing unit 902 is configured to perform other processing of the first device in the foregoing method embodiments other than an information sending and receiving action; and the sending unit 903 is configured to perform various information sending performed by the first device in the foregoing method embodiments. For example, a receiving unit 901 is configured to receive a packet sent by a second device, where the packet includes indication information and an application service identifier. A processing unit 902 is configured to determine a target service node based on the indication information and the application service identifier, where a service capability of the target service node matches the indication information, and a target application service corresponding to the application service identifier is deployed in the target service node. A sending unit 903 is configured to send the packet to the target service node. For a specific execution process, refer to detailed descriptions of corresponding steps in the embodiment shown in FIG. 4. Details are not described here again.

In this embodiment of this application, unit division is an example, and is merely a logical function division. In actual implementation, another division manner may be used. Each of functional units in this embodiment of this application may be integrated into one processing unit, or each of the units may exist alone physically, or two or more units are integrated into one unit. For example, in the foregoing embodiments, the receiving unit and the sending unit may be a same unit, or may be different units. The integrated unit may be implemented in a form of hardware, or may be implemented in a form of a software function unit.

Figure 10:
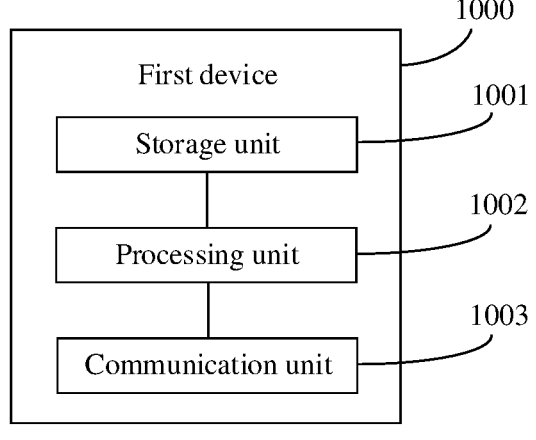
FIG. 10 is a schematic diagram of a structure of another first device according to an embodiment of this application.

When an integrated unit is used, FIG. 10 is another possible schematic diagram of a structure of the first device in the foregoing embodiments. A first device 1000 may also implement the function of the first device in the embodiment shown in FIG. 4. The first device 1000 includes a storage unit 1001, a processing unit 1002, and a communication unit 1003. The communication unit 1003 is configured to support the first device 1000 in communicating with another network entity, for example, communicating with the second device or the service node shown in FIG. 4. For example, a communication unit 1003 is configured to support a first device 1000 in performing step 401, step 403, step 405, and step 406 in FIG. 4. The processing unit 1002 is configured to control and manage an action of the first device 1000. For example, a processing unit 1002 is configured to support a first device 1000 to perform step 402 in FIG. 4, and/or another process performed by the first device in the technology described in this specification. The storage unit 1001 is configured to store program code and data of the first device 1000. For a specific execution process, refer to detailed descriptions of corresponding steps in the embodiment shown in FIG. 4. Details are not described here again.

The processing unit 1002 may be a processor, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this embodiment of this application. The processing module may be a combination of processors implementing a computing function, for example, a combination of one or more microprocessors, or a combination of the DSP and a microprocessor. The communication unit 1003 may be a transceiver, and the storage unit 1001 may be a memory.

Figure 11:
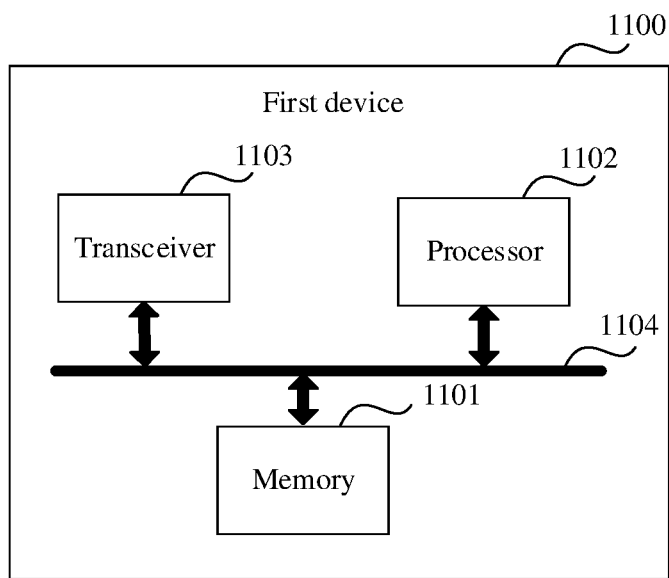
FIG. 11 is a schematic diagram of a structure of still another first device according to an embodiment of this application.

When the processing unit 1002 is a processor, the communication unit 1003 is a transceiver, and the storage unit 1001 is a memory, the first device in this embodiment of this application may be a first device 1100 shown in FIG. 11.

Refer to FIG. 11. The first device 1100 includes a processor 1102, a transceiver 1103, a memory 1101, and a bus 1104. The processor 1102, the transceiver 1103, and the memory 1101 are connected to each other through the bus 1104. The bus 1104 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 11, but this does not mean that there is only one bus or only one type of bus. A first device 1100 may implement the function of the first device in the embodiment shown in FIG. 4. The processor 1102 and the transceiver 1103 may perform the corresponding function of the first device in the foregoing method example. The transceiver 1103 is configured to support the first device 1100 in performing step 401, step 403, step 405, and step 406 in FIG. 4. The processor 1102 is configured to support the first device 1100 in performing step 402 in FIG. 4, and/or another process performed by the first device in the technology described in this specification. The memory 1101 is configured to store program code and data of the first device 1100. For a specific execution process, refer to detailed descriptions of corresponding steps in the embodiment shown in FIG. 4. Details are not described here again.

Figure 12:
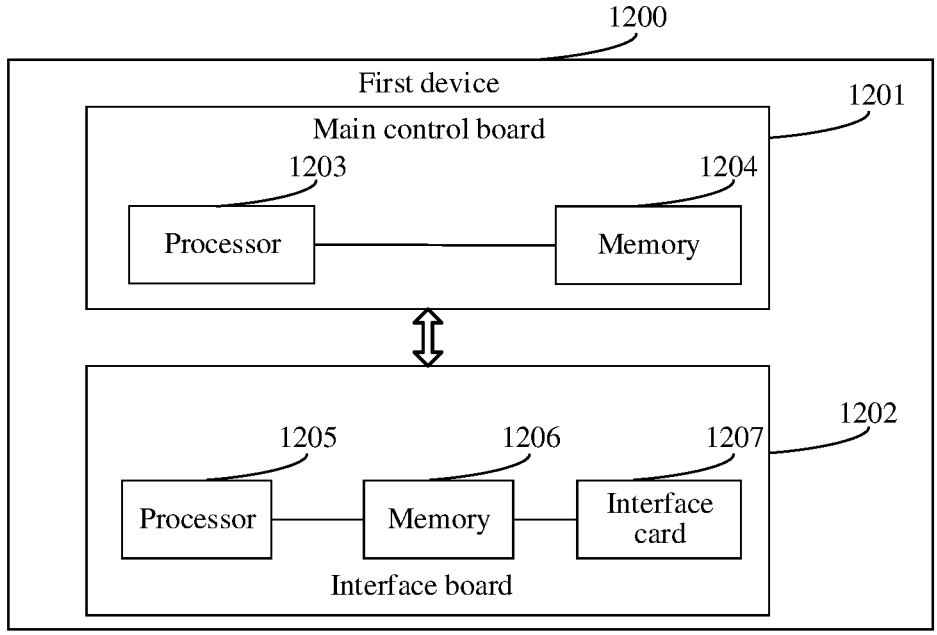
FIG. 12 is a schematic diagram of a structure of yet another first device according to an embodiment of this application.

FIG. 12 is a schematic diagram of a structure of yet another first device according to an embodiment of this application. As shown in FIG. 12, a first device 1200 may be a router, a switch, a gateway, or a network device having a forwarding function. The first device 1200 can implement the function of the first device in the foregoing method embodiment. The first device 1200 includes a main control board 1201 and an interface board 1202. The main control board 1201 includes a processor 1203 and a memory 1204. The interface board 1202 includes a processor 1205, a memory 1206, and an interface card 1207. The main control board 1201 is coupled to the interface board 1202.

The hardware may perform the corresponding function in the foregoing method examples. For example, the memory 1206 may be configured to store program code of the interface board 1202. The processor 1205 is configured to call the program code in the memory 1206 to trigger the interface card 1207 to perform various information receiving and sending performed by the first device in the foregoing method embodiments. For example, the processor 1205 calls program code in the memory 1206 to trigger the interface card 1207 to support the first device 1200 in performing step 401, step 403, step 405, and step 406 in FIG. 4. The processor 1205 is further configured to send a service identifier to the main control board 1201. The memory 1204 may be configured to store program code of the main control board 1201, and the processor 1203 is configured to call the program code in the memory 1204 to perform other processing of the first device in the foregoing method embodiment other than information receiving and sending. For example, the processor 1203 is configured to support the first device 1200 in performing step 402 in FIG. 4, and/or another process performed by the first device in the technology described in this specification. The memory 1204 is configured to store program code and data of the main control board 1201. For a specific execution process, refer to detailed descriptions of corresponding steps in the embodiment shown in FIG. 4. Details are not described here again.

In a possible implementation, an IPC control channel is established between the main control board 1201 and the interface board 1202. The main control board 1201 and the interface board 1202 communicate with each other through the IPC control channel.

Figure 13:
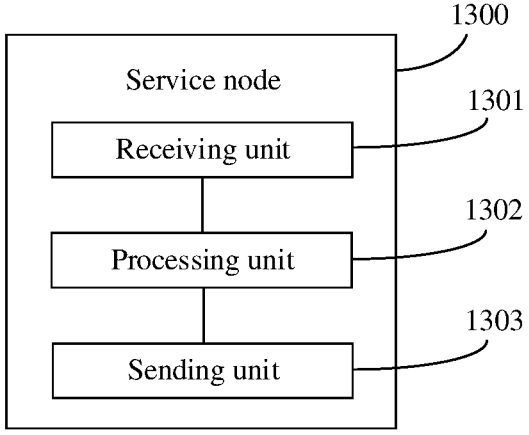
FIG. 13 is a schematic diagram of a structure of a service node according to an embodiment of this application.

FIG. 13 is a schematic diagram of a structure of a service node according to an embodiment of this application. The first device may implement the function of the service node in the embodiment shown in FIG. 4. As shown in FIG. 13, the service node 1300 includes a receiving unit 1301, a processing unit 1302, and a sending unit 1303. These units may perform a corresponding function of the service node in the foregoing method embodiments. The receiving unit 1301 is configured to support the service node in performing step 403 (receiving a packet sent by a first device) in FIG. 4. The processing unit 1302 is configured to support the service node in performing step 404 in FIG. 4 and another process performed by the service node in the technology described in this specification. The sending unit 1303 is configured to support the service node in performing step 405 in FIG. 4. For example, a receiving unit 1301 is configured to perform various information receiving performed by the service node in the foregoing method embodiments; the processing unit 1302 is configured to perform other processing of the service node in the foregoing method embodiments other than an information sending and receiving action; and the sending unit 1303 is configured to perform various information sending performed by the service node in the foregoing method embodiments. For example, a receiving unit 1301 is configured to receive a packet sent by a first device. A processing unit 1302 is configured to generate a first message, where the first message includes a computing power resource level of an application service deployed in the service node. A sending unit 1303 is configured to send the first message to a first device. For a specific execution process, refer to detailed descriptions of corresponding steps in the embodiment shown in FIG. 4. Details are not described here again.

In this embodiment of this application, unit division is an example, and is merely a logical function division. In actual implementation, another division manner may be used. Each of functional units in this embodiment of this application may be integrated into one processing unit, or each of the units may exist alone physically, or two or more units are integrated into one unit. For example, in the foregoing embodiments, the receiving unit and the sending unit may be a same unit, or may be different units. The integrated unit may be implemented in a form of hardware, or may be implemented in a form of a software function unit.

Figure 14:
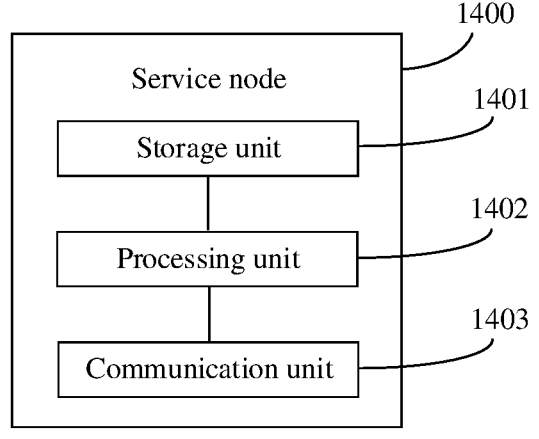
FIG. 14 is a schematic diagram of a structure of another service node according to an embodiment of this application.

When an integrated unit is used, FIG. 14 is another possible schematic diagram of a structure of a service node in the foregoing embodiments. A service node 1400 may also implement the function of the service node in the embodiment shown in FIG. 4. The service node 1400 includes a storage unit 1401, a processing unit 1402, and a communication unit 1403. The communication unit 1403 is configured to support the service node 1400 in communicating with another network entity, for example, communicating with the service node shown in FIG. 4. For example, a communication unit 1403 is configured to support a service node 1400 in performing step 403 and step 405 in FIG. 4. The processing unit 1402 is configured to control and manage an action of the service node 1400. For example, a processing unit 1402 is configured to support a service node 1400 to perform step 404 in FIG. 4, and/or another process performed by the service node in the technology described in this specification. The storage unit 1401 is configured to store program code and data of the service node 1400. For a specific execution process, refer to detailed descriptions of corresponding steps in the embodiment shown in FIG. 4. Details are not described here again.

The processing unit 1402 may be a processor, for example, may be a CPU, a general purpose processor, a DSP, an ASIC, an FPGA or another programmable logic device, a transistor logic device, a hardware component, or any combination thereof. The processor may implement or execute various example logical blocks, modules, and circuits described with reference to content disclosed in this embodiment of this application. The processing module may be a combination of processors implementing a computing function, for example, a combination of one or more microprocessors, or a combination of the DSP and a microprocessor. The communication unit 1403 may be a transceiver, and the storage unit 1401 may be a memory.

Figure 15:
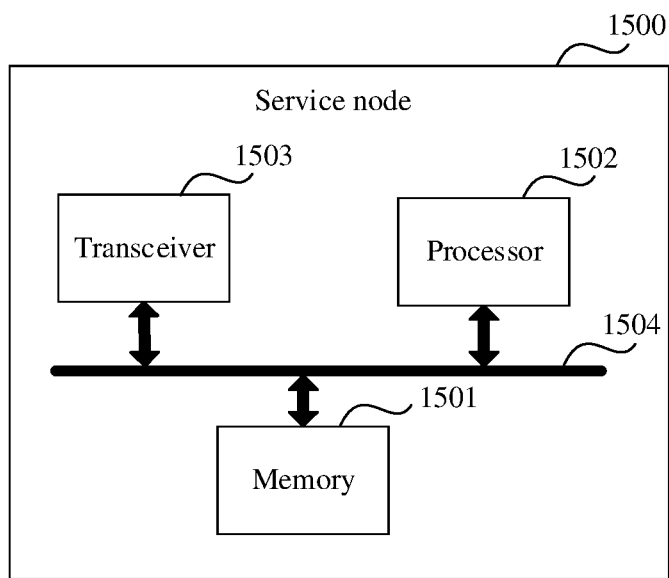
FIG. 15 is a schematic diagram of a structure of still another service node according to an embodiment of this application.

When the processing unit 1402 is a processor, the communication unit 1403 is a transceiver, and the storage unit 1401 is a memory, the service node in this embodiment of this application may be a service node 1500 shown in FIG. 15.

Refer to FIG. 15. The service node 1500 includes a processor 1502, a transceiver 1503, a memory 1501, and a bus 1504. The processor 1502, the transceiver 1503, and the memory 1501 are connected to each other through the bus 1504. The bus 1504 may be a PCI bus, an EISA bus, or the like. The bus may be classified into an address bus, a data bus, a control bus, and the like. For ease of representation, only one bold line is used to represent the bus in FIG. 15, but this does not mean that there is only one bus or only one type of bus. A service node 1500 may implement the function of the service node in the embodiment shown in FIG. 4. The processor 1502 and the transceiver 1503 may perform the corresponding function of the service node in the foregoing method example. The transceiver 1503 is configured to support the service node 1500 in performing step 403 and step 405 in FIG. 4. The processor 1502 is configured to support the service node 1500 in performing step 404 in FIG. 4, and/or another process performed by the service node in the technology described in this specification. The memory 1501 is configured to store program code and data of the service node 1500. For a specific execution process, refer to detailed descriptions of corresponding steps in the embodiment shown in FIG. 4. Details are not described here again.

Figures 16, 17:
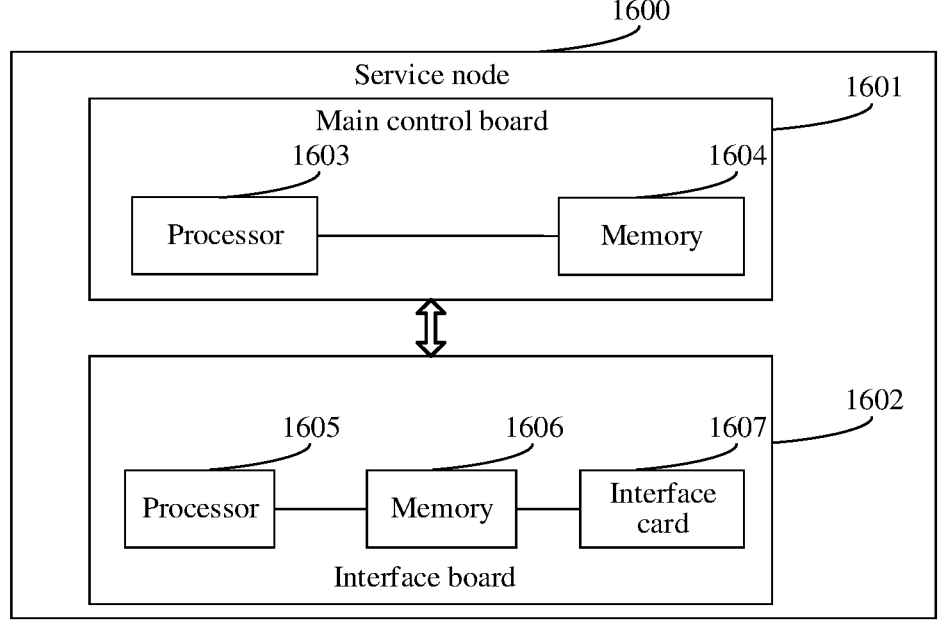
FIG. 16 is a schematic diagram of a structure of yet another service node according to an embodiment of this application.
FIG. 17 is a schematic diagram of a structure of a packet forwarding system according to an embodiment of this application.

FIG. 16 is a schematic diagram of a structure of yet another service node according to an embodiment of this application. As shown in FIG. 16, a service node 1600 may be a router, a switch, a gateway, or a network device having a forwarding function, and the service node 1600 can implement the function of the service node in the foregoing method embodiment. The service node 1600 includes a main control board 1601 and an interface board 1602. The main control board 1601 includes a processor 1603 and a memory 1604. The interface board 1602 includes a processor 1605, a memory 1606, and an interface card 1607. The main control board 1601 is coupled to the interface board 1602.

The hardware may perform the corresponding function in the foregoing method examples. For example, the memory 1606 may be configured to store program code of the interface board 1602, and the processor 1605 is configured to call the program code in the memory 1606 to trigger the interface card 1607 to perform various information receiving and sending performed by the service node in the foregoing method embodiments. For example, the processor 1605 calls the program code in the memory 1606 to trigger the interface card 1607 to support the service node 1600 in performing step 403 and step 405 in FIG. 4. The processor 1605 is further configured to send a service identifier to the main control board 1601. The memory 1604 may be configured to store program code of the main control board 1601, and the processor 1603 is configured to call the program code in the memory 1604 to perform other processing of the service node in the foregoing method embodiment other than information receiving and sending. For example, the processor 1603 is configured to support the service node 1600 in performing step 404 in FIG. 4, and/or another process performed by the service node in the technology described in this specification. The memory 1604 is configured to store program code and data of the main control board 1601. For a specific execution process, refer to detailed descriptions of corresponding steps in the embodiment shown in FIG. 4. Details are not described here again.

In a possible implementation, an IPC control channel is established between the main control board 1601 and the interface board 1602. The main control board 1601 and the interface board 1602 communicate with each other through the IPC control channel.

FIG. 17 is a schematic diagram of a structure of a packet forwarding system according to an embodiment of this application. The system is configured to implement the packet forwarding method in the foregoing method embodiment. As shown in FIG. 17, the system includes a first device 1701 and a service node 1702. The first device 1701 and the service node 1702 may respectively implement the function of the first device and the service node in the embodiment shown in FIG. 4. For example, a first device performs step 402, step 403, and step 406 in FIG. 4, and/or another process performed by the first device in the technology described in this specification. A service node 1702 performs step 404 and step 405 in FIG. 4, and/or is configured to perform another process performed by the service node in the technology described in this specification.

An embodiment of this application further provides a computer-readable storage medium. The computer-readable storage medium stores instructions. When the instructions are executed by a processor of a device, the packet forwarding method according to any one of implementations in the first aspect is implemented; or when the instructions are executed by a processor of a service node, the packet forwarding method according to any one of implementations in the second aspect is implemented.

It should be noted that any described apparatus embodiment is merely an example. The units described as separate parts may or may not be physically separate, and parts displayed as units may or may not be physical units, may be located in one position, or may be distributed on a plurality of network units. A part of or all of the modules may be selected according to the actual needs to achieve the objectives of the solutions of the embodiments. In addition, in the accompanying drawings of embodiments of the first device or the service node provided in this application, a connection relationship between modules indicates that there is a communication connection between the modules, and may be specifically implemented as one or more communication buses or signal cables. A person of ordinary skill in the art may understand and implement the embodiment without creative efforts.

The methods or algorithm steps described with reference to the content disclosed in embodiments of this application may be implemented in a hardware manner, or may be implemented in a manner of executing software instructions by a processor. The software instructions may be formed by a corresponding software module. The software module may be stored in a random access memory (RAM), a flash memory, a read-only memory (ROM), an erasable programmable read-only memory (EPROM), an electrically erasable programmable read-only memory (EEPROM), a hard disk, a removable hard disk, an optical disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may alternatively exist in the core network interface device as discrete components.

In this embodiment of this application, the terms "first", "second", and "third" are used merely for description purposes, and cannot be understood as indicating or implying relative importance.

In addition, the term "and/or" in this application is merely an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the principle of this application should fall within the protection scope of this application.

What is claimed is:

1. A packet forwarding method, wherein the method comprises:

receiving, by a first device, a packet sent by a second device, wherein the packet comprises indication information and an application service identifier;

determining, by the first device and based on the indication information and the application service identifier, a target service node, wherein a service capability of the target service node matches the indication information, and a target application service corresponding to the application service identifier is deployed in the target service node; and responsive to the determining, sending, by the first device, the packet to the target service node, wherein the method further comprises:

receiving, by the first device, first messages sent by the plurality of service nodes, wherein each of the first messages comprises a computing power resource level of an application service deployed in a corresponding service node of the plurality of service nodes.

2. The method according to claim 1, wherein the second device is user equipment, the indication information comprises a user service level corresponding to the second device, and the first device stores correspondences between computing power resource levels and user service levels of application services deployed in a plurality of service nodes; and the determining, by the first device and based on the indication information and the application service identifier, a target service node comprises:

determining, by the first device as the target service node based on the correspondences, a service node, from the plurality of service nodes, in which the target application service whose computing power resource level matches the user service level corresponding to the second device is deployed.

3. The method according to claim 1, wherein the indication information comprises a computing power resource level corresponding to the second device, and the first device stores a computing power resource level of an application service deployed in a plurality of service nodes; and the determining, by the first device and based on the indication information and the application service identifier, a target service node comprises:

determining, by the first device as the target service node, a service node, from the plurality of service nodes, in which the target application service whose computing power resource level is the same as the computing power resource level corresponding to the second device is deployed.

4. The method according to claim 1, wherein each of the first messages is a Border Gateway Protocol (BGP) update message, and the computing power resource level is carried in a path attributes field in the BGP update message.

5. The method according to claim 1, wherein each of the first messages further comprises an application service identifier of the application service deployed in the corresponding service node and an Internet Protocol (IP) address of an instance of the application service deployed in the corresponding service node; or each of the first messages further comprises an anycast IP address corresponding to the application service deployed in the corresponding service node.

6. The method according to claim 1, wherein the indication information comprises computing power resource requirement information of the second device, and the determining, by the first device and based on the indication information and the application service identifier, a target service node comprises:

determining, by the first device as the target service node, a service node in which the target application service whose computing power information meets a requirement indicated by the computing power resource requirement information of the second device is deployed.

7. The method according to claim 6, wherein the method further comprises:

receiving, by the first device, a second message sent by the service node, wherein the second message comprises computing power information of an application service deployed in the service node.

8. The method according to claim 6, wherein the computing power resource requirement information comprises one or more of a quantity of required computing power resources, maximum allowable computing power resource utilization, or a maximum allowable latency of requested processing; and the computing power information of the application service comprises one or more of a quantity of computing power resources allocated to the application service, computing power resource utilization of the application service, a request processing latency of the application service, a quantity of device connections of the application service, or a heavy/light load status of the application service.

9. The method according to claim 1, wherein the packet further comprises content requested to be processed, and the method further comprises:

receiving, by the first device, a processing result sent by the target service node for the content; and sending, by the first device, the processing result to the second device.

10. The method according to claim 1, wherein the packet is a computing request packet, a go-online request packet, or a storage request packet.

11. The method according to claim 1, wherein the packet is an IPv6 packet, and the indication information is carried in a hop by hop extension header or a segment routing header of the IPv6 packet.

12. A packet forwarding method, wherein the method comprises:

generating, by a service node, a first message, wherein the first message comprises a computing power resource level of an application service deployed in the service node; and sending, by the service node, the first message to a first device, wherein each of the first messages further comprises an application service identifier of the application service deployed in the corresponding service node and an Internet Protocol (IP) address of an instance of the application service deployed in the corresponding service node, or each of the first messages further comprises an anycast IP address corresponding to the application service deployed in the corresponding service node.

13. The method according to claim 12, wherein the first message is a border gateway protocol (BGP) update message, and the computing power resource level is carried in a path attributes field in the BGP update message.

14. A packet forwarding apparatus, applied to a first device, wherein the apparatus comprises:

at least one processor; and one or more memories coupled to the at least one processor and configured to store instructions for execution by the at least one processor, the instructions, when executed by the at least one processor, cause the apparatus to:

receive a packet sent by a second device, wherein the packet comprises indication information and an application service identifier;

determine a target service node based on the indication information and the application service identifier, wherein a service capability of the target service node matches the indication information, and a target application service corresponding to the application service identifier is deployed in the target service node; and send the packet to the target service node, wherein the instructions, when executed by the at least one processor, further cause the apparatus to:

receive a first message sent by any service node in the plurality of service nodes, wherein the first message comprises a computing power resource level of an application service deployed in the any service node.

15. The apparatus according to claim 14, wherein the second device is user equipment, the indication information comprises a user service level corresponding to the second device, and the apparatus stores correspondences between computing power resource levels and user service levels of application services deployed in a plurality of service nodes; and the at least one processor is configured to determine, as the target service node based on the correspondences, a service node in which the target application service whose computing power resource level matches the user service level corresponding to the second device is deployed.

16. The apparatus according to claim 14, wherein the indication information comprises a computing power resource level corresponding to the second device, and the apparatus stores a computing power resource level of an application service deployed in a plurality of service nodes; and wherein the instructions, when executed by the at least one processor, cause the apparatus to:

determine, as the target service node, a service node in which the target application service whose computing power resource level is the same as the computing power resource level corresponding to the second device is deployed.

17. The apparatus according to claim 14, wherein the first message is a Border Gateway Protocol (BGP) update message, and the computing power resource level is carried in a path attributes field in the BGP update message.

18. The apparatus according to claim 14, wherein the first message further comprises an application service identifier of the application service deployed in the any service node and an Internet Protocol (IP) address of an instance of the application service deployed in the any service node; or the first message further comprises an anycast IP address corresponding to the application service deployed in the any service node.

* * * * *